United States Patent [19]

Pretzer et al.

[11] 4,411,820

[45] * Oct. 25, 1983

[54] CATALYST AND PROCESS FOR PREPARING ORGANIC URETHANES

[75] Inventors: Wayne R. Pretzer, Gibsonia; Richard B. Pannell, Allison Park, both of Pa.

[73] Assignee: Gulf Research & Development Company, Pittsburgh, Pa.

[*] Notice: The portion of the term of this patent subsequent to May 18, 1999, has been disclaimed.

[21] Appl. No.: 255,695

[22] Filed: Apr. 20, 1981

[51] Int. Cl.³ .................. B01J 31/28; B01J 31/30
[52] U.S. Cl. ................... 502/167; 502/169; 560/24; 560/115; 560/157; 560/27; 560/29
[58] Field of Search .................. 252/429 R, 430

[56] References Cited

U.S. PATENT DOCUMENTS

| | | | |
|---|---|---|---|
| 3,338,956 | 8/1967 | Mountfield | 260/471 |
| 3,531,512 | 9/1970 | Hardy et al. | 260/471 |
| 3,576,835 | 4/1971 | Smith et al. | 260/453 |
| 3,674,827 | 7/1972 | Rao et al. | 260/453 |
| 3,895,054 | 7/1975 | Zajacek et al. | 260/471 |
| 3,929,624 | 12/1975 | Davies et al. | 252/441 X |
| 4,219,661 | 8/1980 | Becker et al. | 560/24 |
| 4,331,560 | 5/1982 | Pretzer et al. | 252/429 R |

*Primary Examiner*—Patrick Garvin
*Attorney, Agent, or Firm*—Arnold, White & Durkee

[57] ABSTRACT

Organic urethanes are prepared by reacting an organic nitrocompound, an organic hydroxy compound, and carbon monoxide in the presence of a novel catalyst system. The catalyst system is comprised of a noble metal compound, a heteroaromatic nitrogen compound, and an oxide of thorium or uranium.

6 Claims, No Drawings

CATALYST AND PROCESS FOR PREPARING ORGANIC URETHANES

CROSS REFERENCE TO RELATED PATENTS

The subject matter of this application is related to that of U.S. patent application Ser. No. 255,693 filed concurrently with this application and now U.S. Pat. No. 4,331,560.

BACKGROUND OF THE INVENTION

This invention relates to a novel catalyst system useful in the preparation of organic urethanes from an organic nitro compound, carbon monoxide, and an organic compound containing at least one hydroxyl.

Organic urethanes are used extensively as foams, fibers and coatings in a variety of industries.

Organic urethanes have been prepared commercially in the past by reacting an isocyanate with a compound contining a hydroxyl group under elevated temperature conditions. Expense of the isocyanate starting compounds and toxicity problems with the isocyanates are drawbacks to this approach. More recently organic urethanes have been prepared by reacting an organic compound containing at least one hydroxyl group with carbon monoxide and an organic nitro compound. For example, such a process employing a metal carbonyl as the catalyst is disclosed in U.S. Pat. No. 3,338,956. A catalyst useful for the production of urethanes comprising palladium or a palladium compound and a transition metal compound is disclosed in U.S. Pat. No. 4,219,661. In this patent, the use of a tertiary amine as a third component in the catalyst system is also disclosed.

SUMMARY OF THE INVENTION

The present inventors have discovered a catalyst system useful in the preparation of organic urethanes. This new catalyst system results in improved yield and selectivity in the reaction of an organic nitro compound, carbon monoxide, and a hydroxy compound to produce an organic urethane.

Accordingly, the present invention provides an improvement in the process for preparing organic urethanes, particularly aromatic urethanes, by reacting the appropriate organic nitro compound with carbon monoxide and an organic compound containing at least one hydroxyl. The improvement comprises employing as the catalyst a system containing (1) a noble metal compound selected from the group consisting of noble metals, compounds containing noble metals and complexes of noble metals with one or more organic or inorganic compounds; (2) one or more heteroaromatic nitrogen compounds, the aromatic ring thereof containing (a) five or six members, (b) only nitrogen and carbon, (c) no more than two nitrogen atoms, and (d) at least two double bonds; and (3) an actinide oxide selected from the oxides of uranium and thorium as hereinafter defined.

The present invention also provides a novel catalyst useful in the preparation of organic urethanes. The catalyst system is comprised of (1) a noble metal compound selected from the group consisting of noble metals, compounds containing noble metals and complexes of noble metals with one or more organic or inorganic compounds; (2) one or more heteroaromatic nitrogen compounds, the aromatic ring thereof containing (a) five or six members, (b) only nitrogen and carbon, (c) no more than two nitrogen atoms, and (d) at least two double bonds, and (3) an actinide oxide selected from the oxides of uranium and thorium.

DETAILED DESCRIPTION OF THE INVENTION AND PREFERRED EMBODIMENTS

The Urethane Preparation Process

The subject invention provides a novel catalyst system useful in a direct conversion of organic nitro compounds and organic hydroxy compounds to the corresponding organic urethanes by reaction of the organic nitro compound with carbon monoxide and an organic hydroxy compound at elevated temperatures and pressures. The term "organic nitro compound" should be understand to indicate any organic compound containing one or more nitro groups which are capable of being converted to urethane groups through the catalyzed reaction with carbon monoxide and an organic hydroxy compound. Any organic nitro compound capable of being converted to an organic urethane may be employed. Thus, where the term "organic nitro compound" is used throughout this disclosure and claims, it is intended that the term define substituted and unsubstituted aromatic, cycloaliphatic and aliphatic mono- or poly-nitro compounds which can be reacted to form the corresponding urethanes by means of the catalytic process described herein. A list of suitable organic nitro compounds are set forth in the disclosure of U.S. Pat. No. 3,576,835 and such disclosure is hereby incorporated by reference. It should be pointed out that isomers and homologues of the aforesaid organic nitro compounds, as well as mixtures of one or more such organic nitro compounds, may be employed. Additionally, compounds which have both nitro and isocyanate substituents, e.g., 2-iso-cyanato-4-nitrotoluene, may also be employed as a reactant in the process, the only limitation being that the organic nitro compound be capable of being converted to the corresponding organic urethane.

The process of this invention is particularly effective in the conversion of aromatic nitro compounds to the corresponding aromatic urethane. Aromatic nitro compounds, as the term is used in the description and claims hereof, will refer to aromatic compounds such as benzene, naphthalene and the like having at least one nitro group attached directly to an aromatic hydrocarbon nucleus, as indicated earlier the aromatic hydrocarbon nucleus may also be substituted. Preferred aromatic nitro compounds suitable to be used in the practice of this invention include the nitro benzenes, both mono- and poly-nitro, including isomeric mixtures thereof, nitro-alkyl benzenes, including the various nitrated toluenes and nitrated xylenes, nitrated biphenyl and nitrated biphenyl methylene. Among others preferred are bis (nitro-phenoxy) alkylene and bis (nitro-phenoxy) alkyl ethers.

Generally, the organic nitro compound will contain from about one to about twenty carbon atoms. The preferred aromatic nitro compounds will be those in which the nitro group or groups appear on benzene or naphthalene rings, and will have between about six and about fourteen carbon atoms.

Organic compounds contining hydroxy groups suitable for use in accordance with the present invention include monohydric alcohols, polyhydric alcohols, monohydric phenols and polyhydric phenols. The alcohols include linear or branch monohydric or polyhydric alkanols, cycloalkanols, alkenols, cycloalkenols, aralkyl alcohols and the like. These alcohols may contain a substituent containing oxygen, nitrogen, sulfur or a halogen atom. These additional elements may appear as a variety of functional groups including sulfoxides, sulfones, amines, amides, carbonyl or carboxylic acid ester groups. Among the suitable monohydric alcohols are methanol, ethanol, propanol, isopropanol, butanol, pentanol, hexanol, cyclohexanol, and benzyl alcohol. Among the suitable polyhydric alcohols are, for example, ethylene glycol, diethylene glycol, propylene glycol, dipropylene glycol, glycerine, hexane triol, and the like and polyols of higher functionality such as sorbitol. The preferred alcohols are the monohydric aliphatic alcohols containing from one to six carbon atoms, with ethanol being particularly preferred.

Among the suitable phenols for use in accordance with the present invention are phenol, chlorophenol, cresols, ethylphenols, propylphenols, butylphenols and higher alkyl phenols, pyrocatechol, resorcinol, 4,4'-dihydroxy diphenol methane, bisphenol-A, anthranol, phenanthrol, pyrogallol, phloroglucinol, and the like.

The Catalyst System

The catalyst system of this invention will be a mixture or complex containing three critical components:
(1) a noble metal compound,
(2) a heteroaromatic nitrogen compound, and
(3) an oxide of uranium or thorium.

The Noble Metal Compound

The first component of the catalyst system of the invention is a noble metal compound. The noble metals include gold, iridium, osmium, palladium, platinum, rhenium, rhodium, ruthenium, and silver. Compounds of these elements which may be used in accordance with this process include oxides, sulfates, nitrates, halides, carbonates, sulfides, acetates, oxylates, other organic salts, carbonyls, organic complexes, and the like. The term "noble metal compound" shall refer to both the elemental form of the noble metal and the compounds of the noble metal throughout the description and claims. The preferred noble metal compounds are selected from the group consisting of the noble metals, noble metal halides, noble metal oxides, organic salts of noble metals and organic complexes of noble metals. It is especially preferred that the noble metal be one of the platinum, series including palladium, rhodium, platinum, iridium and mixtures thereof. The most preferred noble metal compounds are the halides of palladium and rhodium, specifically palladous dichloride and rhodium trichloride.

The Heteroaromatic Nitrogen Compound

The heteroaromatic nitrogen compound component of the catalyst is a compound having between five and six members in the ring, only carbon and nitrogen in the ring, no more than two nitrogen atoms in the ring, and having at least two double bonds in the ring. Derivatives of such heteroaromatic nitrogen compounds may also be used. Throughout the description and claims, the term derivative when used in conjunction with heteroaromatic nitrogen compounds includes additions to the parent heteroaromatic nitrogen containing ring. Representative heteroaromatic nitrogen compounds and derivatives thereof which are suitable for use as components of the catalyst of this invention are listed below. A more exhaustive listing of suitable heteroaromatic compounds may be found in U.S. Pat. No. 3,576,835, which is hereby incorporated by reference.
(1) 1-methyl pyrrole
(2) imidazole
(3) carbazole
(4) pyridine
(5) 2, 6-dimethyl pyridine
(6) 2,4,6-trimethyl pyridine
(7) 4-phenyl pyridine
(8) quinoline
(9) isoquinoline
(10) benzo isoquinoline
(11) pyrazine
(12) cinnoline
(13) pyridine hydrochloride
(14) lauryl pyridium chloride
(15) picolinic acid
(16) 4-picoline-1-oxide
(17) 3-picoline-1-oxide
(18) pyridine.$SO_3$
(19) (pyridine)$_3$ $FeCl_3$
(20) Pd (isoquinoline)$_2$ $Cl_2$ The preferred heteroaromatic nitrogen compounds are those selected from the group consisting of pyridine, isoquinoline, quinoline, and derivatives thereof. It is also preferred to use the heteroaromatic nitrogen compound in the catalyst system of the invention in the form of a complex with a noble metal halide of component one. The complex may be preformed prior to its addition to the reaction mixture as described in U.S. Pat. No. 3,576,835, which is hereby incorporated by reference. Alternatively, the catalyst components may be added separately to the reaction mixture and the complex formed in situ. The preferred complexes are those formed by combining the preferred noble metal halides with the preferred heteroaromatic nitrogen, specifically Pd (pyridine)$_2$ $Cl_2$, Pd (pyridine)$_2$ $Cl_4$, Pd (isoquinoline)$_2$ $Cl_4$, Pd (isoquinoline)$_2$ $Cl_2$, Rh (pyridine)$_3$ $Cl_3$ and Rh (isoquinoline)$_3$ $Cl_3$.

The Actinide Oxide

While organic urethanes may be produced with a catalyst comprised of a noble metal or a noble metal compound and a heteroaromatic nitrogen compound, the selectivity and yield to urethanes is greatly increased by the addition of a third component to the catalyst system. This third component is selected from the oxides of the actinide group of heavy metals, in particular, the oxides of uranium and thorium. It appears the oxides of uranium and thorium are the only actinide compounds practical for use in the present invention due to the fact that the other members of this group are highly radioactive and rapidly decay to produce compounds which do not possess the useful properties required in this invention.

Additionally, it appears that all oxides of the two actinides within the scope of the present invention are not suitable. With regard to uranium oxides, it has been established that $UO_2$, $U_2O_5$, $U_2O_7^{+2}$ and $U_3O_8$ are acceptable. $UO_2^{+2}$, specifically $(NH_4)_2$ $U_2O_7$, on the other hand appears to contribute little or no improvement when used as a component of the invention catalyst system.

Process and System Parameters

Certain constituents of each of the three mentioned elements of the catalyst system are significantly more effective than others in improving the selectivity and yield to urethanes of the process. The halides, oxides, acetates, and organic complexes of the noble metals are among the more effective noble metal compounds. Among the more effective heteroaromatic nitrogen compounds are:

(1) pyridine
(2) 2,6-dimethyl pyridine
(3) 2,4,6-trimethyl pyridine
(4) 4-phenyl pyridine
(5) 3-chloro pyridine
(6) lauryl pyridium chloride
(7) quinoline
(8) 7,8-benzo quinoline
(9) 2-chloro quinoline
(10) isoquinoline
(11) benzo isoquinoline
(12) imidazole
(13) picolinic acid
(14) 4-picoline-1-oxide
(15) 3-picoline-1-oxide Pyridine, quinoline and isoquinoline are particularly preferred heteroaromatic nitrogen compounds.

The preferred actinide oxides are those of uranium and thorium. More particularly the preferred compounds are $UO_2$, $U_2O_5$, $U_2O_7^{+2}$, $U_3O_8$ and $ThO_2$. The surface area of the heavy metal oxide should be in the range from about 0.05 $m^2$/gm to about 30 $m^2$/gm. Preferably the minimum surface area should not be less than 0.1 $m^2$/gm. The maximum surface area will be limited by practical restraints of obtaining the particle size. Surface areas in the range of 2 $m^2$/gm are currently commercially available.

The catalyst system can be self-supported or deposited on a support or carrier. Alumina, asbestos, barium sulfate, calcium carbonate, carbon, diatomaceous earth, fuller's earth and analogous materials are useful as carriers for this purpose.

The noble metal compounds, the heteroaromatic nitrogen compound, and the heavy metal compound may be added separately to the organic nitro compound and the organic hydroxy compound reactants or if desired may be premixed prior to adding to the reactants.

The proportion of the catalyst system is generally equivalent to between about 0.001 and about 500 percent, and preferably between about 1.0 and about 100 percent by weight of the organic nitro compound. Greater or lesser proportions may be used.

The molar ratio of the heteroaromatic compound to noble metal compound is generally between about 0.1:1 and about 20:1 and preferably between about 0.5:1 and 10:1.

The weight ratio of the noble metal compound component of the catalyst system to the actinide oxide component of the catalyst system is generally between about 0.001:1 and 50:1 and preferably in the range between of about 0.05:1 and 25:1.

Although the process of this invention operates effectively in the absence of solvent, a solvent chemically inert to the reactants and catalyst may be used. Among suitable solvents are aliphatic, cycloaliphatic, and aromatic hydrocarbons such as heptane, cyclohexane, toluene, xylene and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene. In addition if an excess of organic hydroxy compound is used in the reaction, the excess can serve as a solvent. The choice of solvent for the production of a particular urethane will be dependent upon such considerations as the solubility of the organic nitro compound feed, the solubility of the resulting organic urethane, and the technique to be used for isolation of the organic urethane.

The proportion of solvent is not critical and any proportion maybe used. If used, generally the weight percent of the organic nitro compound in the solvent is between 5.0 and 75.0 percent.

The order of mixing of the reactants and the catalyst components is not critical and may be varied as desired. A typical embodiment utilizing a batch process entails charging the organic nitro compound, the organic hydroxy compound, the noble metal compound, the heteroaromatic nitrogen compound and the actinide oxide into a reactor. The reactor is then pressured with carbon monoxide and heated to the desired temperature. Additional carbon monoxide is fed to the reactor as needed. The preferred reaction pressure is between 100 and 20,000 p.s.i.g., but greater or lesser pressures may be employed. The reaction temperature is generally maintained above 25° C. and preferably between about 100° and about 250° C.

The ratio of organic nitro compound to organic hydroxy compound may be varied. The minimum amount of hydroxy compound is determined from the stoichiometric ratio of the organic nitro compound and the organic hydroxy compound. An excess of organic hydroxy compound will not interfere with the reaction and may in some instances be useful as solvent.

Reaction time is dependent upon starting materials, catalyst concentration, temperature and pressure, as well as the configuration of the processing equipment. In a batch process, reaction times of one-half hour to twenty hours are usually required to obtain the desired degree of reaction. After the reaction is completed, the temperature of the reactor may be lowered to ambient temperature, the pressure is vented, and the reaction products removed. The catalyst is then removed from the reaction products by filtration, centrifugation, or other suitable solid-liquid separation techniques. The organic urethane is then isolated from the reaction product by fractional distillation. Extraction, sublimation and other suitable techniques may be used instead of distillation to separate the organic urethane from unreacted organic nitro compound, the organic hydroxy compound, and from any by products formed.

The reaction can also be carried out continuously. In a continuous process, the reaction time may be substantially instantaneous and residence time in the reactor much shorter than in a batch process. An example of such a continuous process would be to slurry the catalyst system with the organic nitro compound feed and the organic hydroxy compound feed; introduce the feed-catalyst slurry into a continuous reactor of such configuration as would provide the required temperature, pressure, and residence time; simultaneously introduce the carbon monoxide; after passage of the reaction through the reactor, separate the resulting urethane from the reaction mixture; and recycle the catalyst, any unreacted starting materials, and the solvent.

The organic urethanes produced by this process are suitable for the production of polyurethane compositions such as foams, coatings, fibers, and the like. The following examples are presented to describe the present invention in more detail. Such examples are presented for purposes of illustration only and shall not under any circumstances be deemed as limiting the present invention.

EXAMPLES

Into a 300 cc. stainless steel autoclave, nitro benzene, ethanol, and the catalyst consisting of a noble metal compound, a heteroaromatic nitrogen compound, and an additional metal compound, if used, were charged. The autoclave was sealed, purged with nitrogen and then pressured with carbon monoxide to a pressure of about 1000 p.s.i.g., which is lower than the desired reaction pressure. The autoclave was then heated to the desired temperature and the pressure was adjusted to the desired value. A constant pressure was maintained throughout the reaction by constantly admitting carbon monoxide into the reactor on demand from a high pressure reservoir. After the desired reaction period, the autoclave was cooled and the reaction product removed. The product was weighed and analyzed by vapor phase chromatography. The reactants, catalyst, conditions and results are tabulated in the following Tables.

TABLE I

NITROBENZENE CARBONYLATION

| No. | Grams $PdCl_2$ | Grams Pyridine | Additional Catalyst Component (Gms) | Grams $NO_2$ | Grams Ethanol | Temp, °C. | Hrs. Time | CO Pressure psig (MPa) | % Conv. $NO_2$ | Urethane Selectivity Wt. % | Moles Urethane Moles Pd. hr |
|---|---|---|---|---|---|---|---|---|---|---|---|
| 1 | 0.500 | 0.50 | $UO_2$ (0.10) | 10.0 | 35.5 | 175° | 1 | 3500 (23.9) | 46.0 | 99 | 15.2 |
| 2 | 0.500 | 0.50 | $U_2O_5$ (0.50) | 10.0 | 35.5 | 175° | 4 | 3500 (23.9) | 74.7 | 85.4 | 4.6 |
| 3 | 0.500 | 0.50 | $U_2O_5$ (0.10) | 10.0 | 35.5 | 175° | 4 | 2000 (13.7) | 56.7 | 92.0 | 4.0 |
| 4 | 0.880 | 0.50 | $U_2O_5$ (0.175) | 10.0 | 35.5 | 175° | 1 | 3500 (23.9) | 92.9 | 99 | 16.0 |

TABLE II

EFFECT OF CO PRESSURE ON NITROBENZENE CARBONYLATION

| 1 | 0.500 | 0.50 | $U_2O_5$ (0.100) | 10.0 | 35.5 | 175° | 1 | 2500 (17.1) | 42.4 | 61.9 | 7.4 |
|---|---|---|---|---|---|---|---|---|---|---|---|
| 2 | 0.500 | 0.50 | $U_2O_5$ (0.100) | 10.0 | 35.5 | 175° | 1 | 2750 (18.8) | 43.2 | 67.9 | 8.2 |
| 3 | 0.530 | 0.48 | $U_2O_5$ (0.100) | 10.0 | 35.5 | 175° | 1 | 3500 (23.9) | 62.7 | 99 | 18.4 |
| 4 | 0.500 | 0.50 | $U_2O_5$ (0.100) | 10.0 | 35.5 | 175° | 1 | 4000 (27.3) | 40.6 | 65.4 | 7.5 |

TABLE III

EFFECT OF TEMPERATURE ON NITROBENZENE CARBONLYLATION

| 1 | 0.500 | 0.50 | $U_2O_5$ (0.100) | 10.0 | 35.5 | 150° | 1 | 3500 (23.9) | 32.6 | 41.2 | 3.8 |
|---|---|---|---|---|---|---|---|---|---|---|---|
| 2 | 0.500 | 0.50 | $U_2O_5$ (0.100) | 10.0 | 35.5 | 165° | 1 | 3500 (23.9) | 36.4 | 87.2 | 8.9 |
| 3 | 0.530 | 0.48 | $U_2O_5$ (0.106) | 10.0 | 35.5 | 175° | 1 | 3500 (23.9) | 62.7 | 99 | 18.4 |
| 4 | 0.500 | 0.50 | $U_2O_5$ (0.100) | 10.0 | 35.5 | 185° | 1 | 3500 (23.9) | 47.7 | 85.1 | 11.4 |
| 5 | 0.500 | 0.50 | $U_2O_5$ (0.100) | 10.0 | 35.5 | 195° | 1 | 3500 (23.9) | 44.7 | 79.2 | 10.0 |

TABLE IV

EFFECT OF PYRIDINE CONCENTRATION ON NITROBENZENE CARBONYLATION

| No. | Grams $PdCl_2$ | Grams Pyridine | Additional Catalyst Component (Gms) | Grams $NO_2$ | Grams Ethanol | Temp, °C. | Hrs. Time | CO Pressure psig (MPa) | % Conv. $NO_2$ | Urethane Selectivity Wt. % | Moles Urethane Moles Pd.hr |
|---|---|---|---|---|---|---|---|---|---|---|---|
| 1 | 0.501 | None | $U_2O_5$ (0.1) | 10.0 | 35.5 | 175° | 1 | 3500 (23.9) | 37.1 | 65.3 | 6.8 |
| 2 | 0.500 | 0.22 | $U_2O_5$ (0.1) | 10.0 | 35.5 | 175° | 1 | 3500 (23.9) | 44.8 | 99 | 12.9 |
| 3 | 0.500 | 0.45 | $U_2O_5$ (0.1) | 10.0 | 35.5 | 175° | 1 | 3500 (23.9) | 59.9 | 99 | 18.0 |
| 4 | 0.500 | 0.67 | $U_2O_5$ (0.1) | 10.0 | 35.5 | 175° | 1 | 3500 (23.9) | 42.0 | 89.0 | 10.7 |
| 5 | 0.500 | 0.89 | $U_2O_5$ (0.1) | 10.0 | 35.5 | 175° | 1 | 3500 (23.9) | 33.2 | 85.0 | 8.1 |

TABLE V

EFFECT OF CO-CATALYST ON NITROBENZENE CARBONLYLATION

| 1 | 0.500 | 0.50 | None | 10.0 | 35.5 | 175° | 4 | 3500 (23.9) | 24.2 | 80.2 | 1.4 |
|---|---|---|---|---|---|---|---|---|---|---|---|
| 2 | 0.500 | 0.50 | $UO_2(NO_3)_2.6H_2O$ (0.10) | 10.0 | 35.5 | 175° | 4 | 3500 (23.9) | 35.7 | 91.6 | 2.4 |
| 3 | 0.500 | 0.50 | $La_2O_3$ (0.10) | 10.0 | 35.5 | 175° | 4 | 3500 (23.9) | 26.4 | 76.9 | 1.4 |
| 4 | 0.500 | 0.50 | $(NH_4)_2 U_2O_7$ (0.10) | 10.0 | 35.5 | 175° | 4 | 3500 (23.9) | 61.8 | 99 | 4.5 |
| 5 | 0.500 | 0.50 | $UO_2$ (0.1) | 10.0 | 35.5 | 170° | 4 | 3500 (23.9) | 50.5 | 99 | 3.7 |
| 6 | 0.500 | 0.50 | $ThO_2$ (0.1) | 10.0 | 35.5 | 175° | 4 | 3500 (23.9) | 85.7 | 92.5 | 5.7 |
| 7 | 0.500 | 0.50 | $U_3O_8$ (0.1) | 10.0 | 35.5 | 175° | 4 | 3500 (23.9) | 84.4 | 99 | 6.6 |
| 8 | 0.500 | 0.50 | $U_2O_5$ (0.1) | 20.0 | 23.7 | 175° | 4 | 3500 (23.9) | 69 | 99 | 10.1 |

The foregoing description has been directed to a particular embodiment of the invention for the purposes of illustration and explanation. Those skilled in the art will readily appreciate modifications and changes in the procedures set forth without departing from the scope and spirit of the invention. Applicants' intent is that the following claims be interpreted to embrace all such modifications and variations.

The subject matter which applicants claim as their invention is:

1. A catalyst system useful in the preparation of organic urethanes from the corresponding organic nitro compounds and organic hydroxy compounds which comprises in combination:
   (a) a noble metal compound,
   (b) a heteroaromatic nitrogen compound having a ring with,
      (1) between five and six members in the ring,
      (2) only nitrogen and carbon in the ring,
      (3) no more than two nitrogens in the ring,
      (4) at least two double bonds in the ring,
      wherein the molar ratio of the heteroaromatic nitrogen compound to the noble metal compound lies between about 0.1 to 1 and 20 to 1,
   (c) an actinide oxide selected from the group consisting of $UO_2$, $U_2O_5$, $U_2O_7{}^{-2}$, $U_3O_8$ and $ThO_2$, wherein the weight ratio of the noble metal compound to the actinide oxide lies between about 0.001 to 1 and 50 to 1.

2. A catalyst system as in claim 1 wherein, the said noble metal compound is selected from the group consisting of noble metals, nole metal halides, noble metal oxides, organic salts of noble metals and organic complexes of noble metals.

3. A catalyst system as in claim 2 wherein, the said heteroaromatic nitrogen compound is selected from the group consisting of
   (a) pyridine
   (b) 2,6-dimethyl pyridine
   (c) 2,4,6-trimethyl pyridine
   (d) 4-phenyl pyridine
   (e) 3-chloro pyridine
   (f) lauryl pyridium chloride
   (g) quinoline
   (h) 7,8 benzo quinoline
   (i) 2-chloro quinoline
   (j) isoquinoline
   (k) benzo isoquinoline
   (l) imidazole
   (m) picolinic acid
   (n) 4-picoline-1-oxide
   (o) 3-picoline-1-oxide.

4. A catalyst system useful in the preparation of aromatic urethanes from the corresponding aromatic nitro compounds and organic hydroxy compounds which comprises in combination:
   (a) a noble metal chloride selected from the group consisting of the chlorides of palladium and rhodium,
   (b) a heteroaromatic nitrogen compound selected from the group consisting of pyridine, quinoline, and isoquinoline,
   (c) an actinide oxide selected from the group consisting of $UO_2$, $U_2O_5$, $U_2O_7{}^{-2}$, $U_3O_8$ and $ThO_2$,
   wherein the molar ratio of the heteroaromatic nitrogen compound to the noble metal compound lies between about 0.5 to 1 and 10 to 1 and the weight ratio of the noble metal compound to the actinide oxide lies between about 0.05 to 1 and 25 to 1.

5. The catalyst system of claim 1, wherein the actinide oxide is $U_2O_5$.

6. A catalyst system useful in the preparation of organic urethanes from the corresponding organic nitro compounds and organic hydroxy compounds which comprises in combination:
   a. $PdCl_2$,
   b. pyridine, and
   c. $U_2O_5$, where in the molar ratio of the pyridine to the $PdCl_2$ lies between about 0.5 to 1 and 10 to 1 and the weight ratio of the $PdCl_2$ to the $U_2O_5$ lies between about 0.5 to 1 and 25 to 1.

* * * * *